(12) United States Patent
Bauer et al.

(10) Patent No.: US 9,371,101 B1
(45) Date of Patent: Jun. 21, 2016

(54) BICYCLE PARKING RACK FEATURING FLEXIBLE ROPE WIRE

(71) Applicants: Greg A. Bauer, Sacramento, CA (US); Donn Van Dusen, Yuba City, CA (US)

(72) Inventors: Greg A. Bauer, Sacramento, CA (US); Donn Van Dusen, Yuba City, CA (US)

(73) Assignee: Park A Bike, Inc., Sacramento, CA (US)

( * ) Notice: Subject to any disclaimer, the term of this patent is extended or adjusted under 35 U.S.C. 154(b) by 0 days.

(21) Appl. No.: 14/340,191

(22) Filed: Jul. 24, 2014

Related U.S. Application Data

(60) Provisional application No. 61/857,774, filed on Jul. 24, 2013.

(51) Int. Cl.
*A47F 7/00* (2006.01)
*E05B 73/00* (2006.01)
*B62H 3/00* (2006.01)
*B62H 5/00* (2006.01)

(52) U.S. Cl.
CPC . *B62H 3/00* (2013.01); *B62H 5/003* (2013.01)

(58) Field of Classification Search
CPC .............. B62H 3/00; B62H 1/00; B62H 1/06; B62H 2003/005; B62H 27/00; B62H 5/003; E05B 67/003
USPC ............ 211/22, 17, 21, 5; 248/127, 146, 153, 248/176.1, 346.01, 346.03, 346.5
See application file for complete search history.

(56) References Cited

U.S. PATENT DOCUMENTS

| | | | | |
|---|---|---|---|---|
| 3,762,569 | A * | 10/1973 | Spring | 211/5 |
| 3,827,773 | A * | 8/1974 | Aiello | 312/100 |
| 4,064,714 | A * | 12/1977 | Treslo | 70/18 |
| 4,080,020 | A * | 3/1978 | Candelaria | 312/100 |
| 4,807,453 | A * | 2/1989 | Bernier et al. | 70/233 |
| 4,870,843 | A * | 10/1989 | Lundberg | 70/233 |
| 4,920,334 | A * | 4/1990 | DeVolpi | 340/568.4 |
| 5,278,538 | A * | 1/1994 | Ainsworth et al. | 340/427 |
| 5,408,212 | A * | 4/1995 | Meyers et al. | 340/427 |
| 5,438,854 | A * | 8/1995 | Seraj | 70/38 A |
| 5,706,679 | A * | 1/1998 | Zane et al. | 70/18 |
| 5,967,077 | A * | 10/1999 | Shapiro | 114/343 |
| 6,223,907 | B1 * | 5/2001 | Graber | 211/5 |
| 6,430,973 | B1 * | 8/2002 | Huang | 70/18 |
| 7,571,628 | B2 * | 8/2009 | D'Anieri | 70/234 |
| 8,065,895 | B2 * | 11/2011 | Andersen | 70/14 |
| 8,905,245 | B2 * | 12/2014 | Long | 211/20 |
| 2008/0276664 | A1 * | 11/2008 | Shu | 70/18 |
| 2011/0079564 | A1 * | 4/2011 | Palmer | 211/22 |
| 2012/0137741 | A1 * | 6/2012 | Yu et al. | 70/53 |
| 2014/0230498 | A1 * | 8/2014 | Elson | 70/15 |

OTHER PUBLICATIONS http://web.archive.org/web/20120429191242/http://www.keha3.ee/en/products/tulip-fun-fun.*

* cited by examiner

*Primary Examiner* — Jennifer E Novosad
(74) *Attorney, Agent, or Firm* — Heisler & Associate

(57) ABSTRACT

The parking rack is formed of a length of rope wire curved generally into a majority of a circle. The rope wire extends between a first end and a second end. The rope wire is formed of bundles of individual strands of wire with a coating on an outside thereof. The coating is preferably somewhat resilient and at least partially transparent. The ends of the rope wire are fixed to an anchor through a first interface and a second interface. These interfaces are offset laterally so that the rope wire follows somewhat of a helical path to maintain stability while still exhibiting flexibility. Bicycles can thus be parked adjacent to the parking rack and secured thereto with the flexibility characteristics of the parking rack minimizing damage and maximizing convenience in attaching the bicycle to the parking rack.

10 Claims, 3 Drawing Sheets

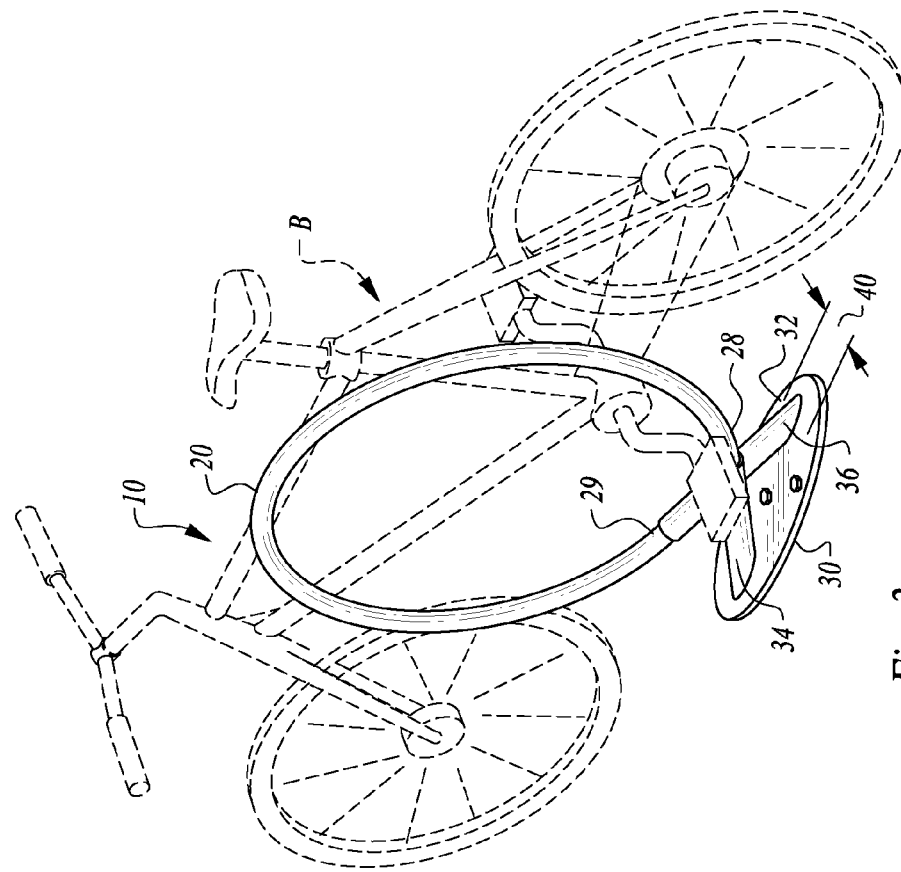
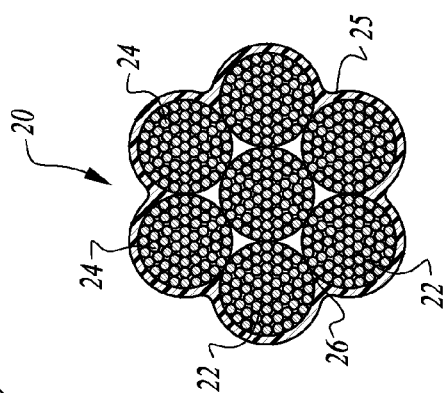
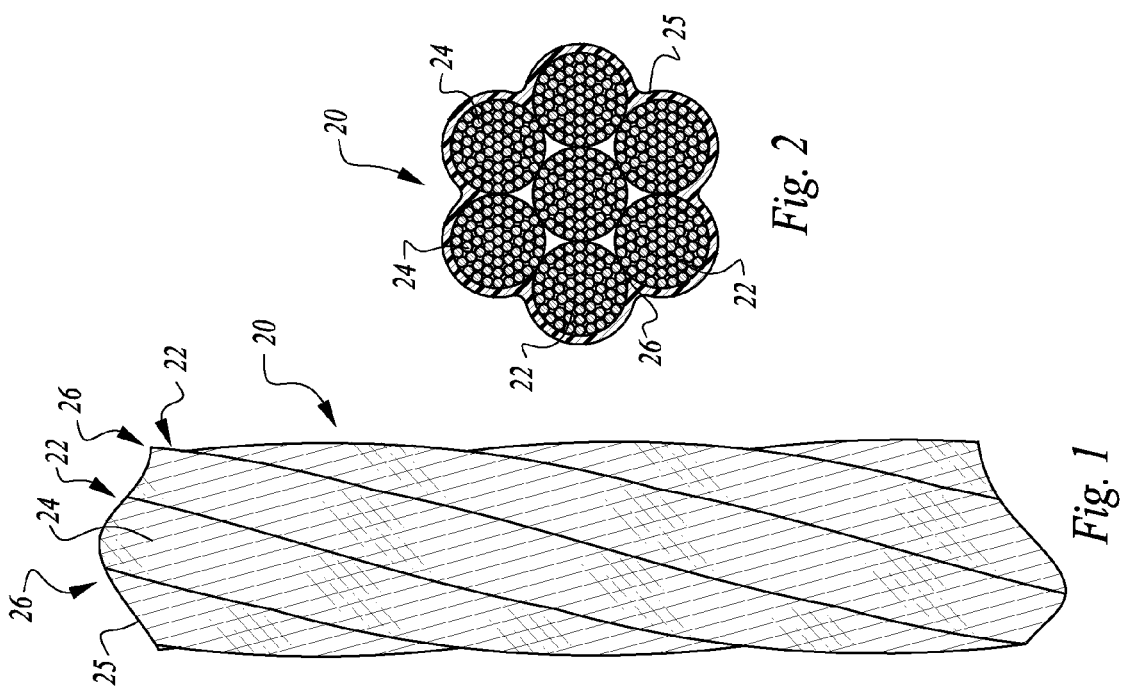

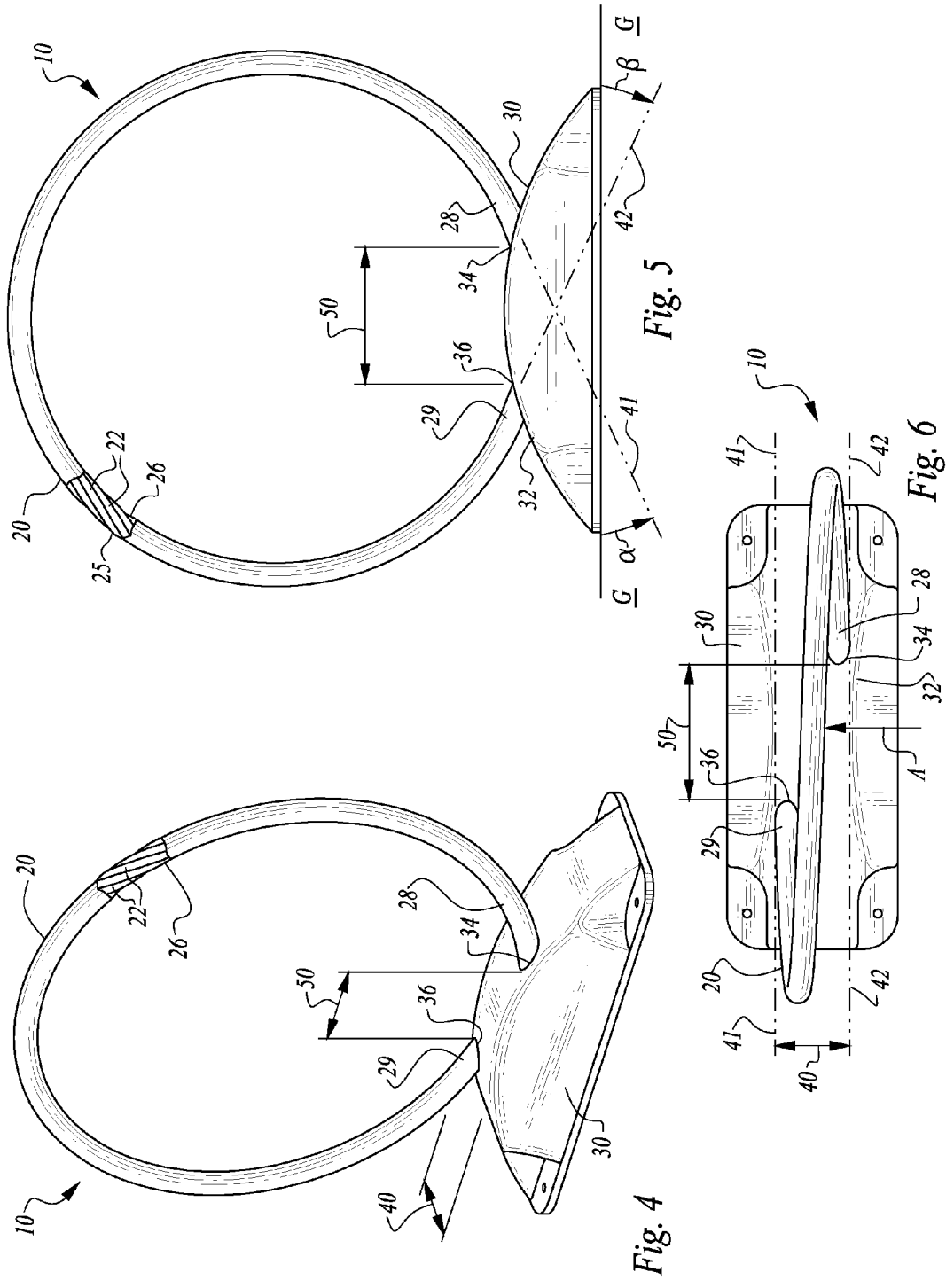

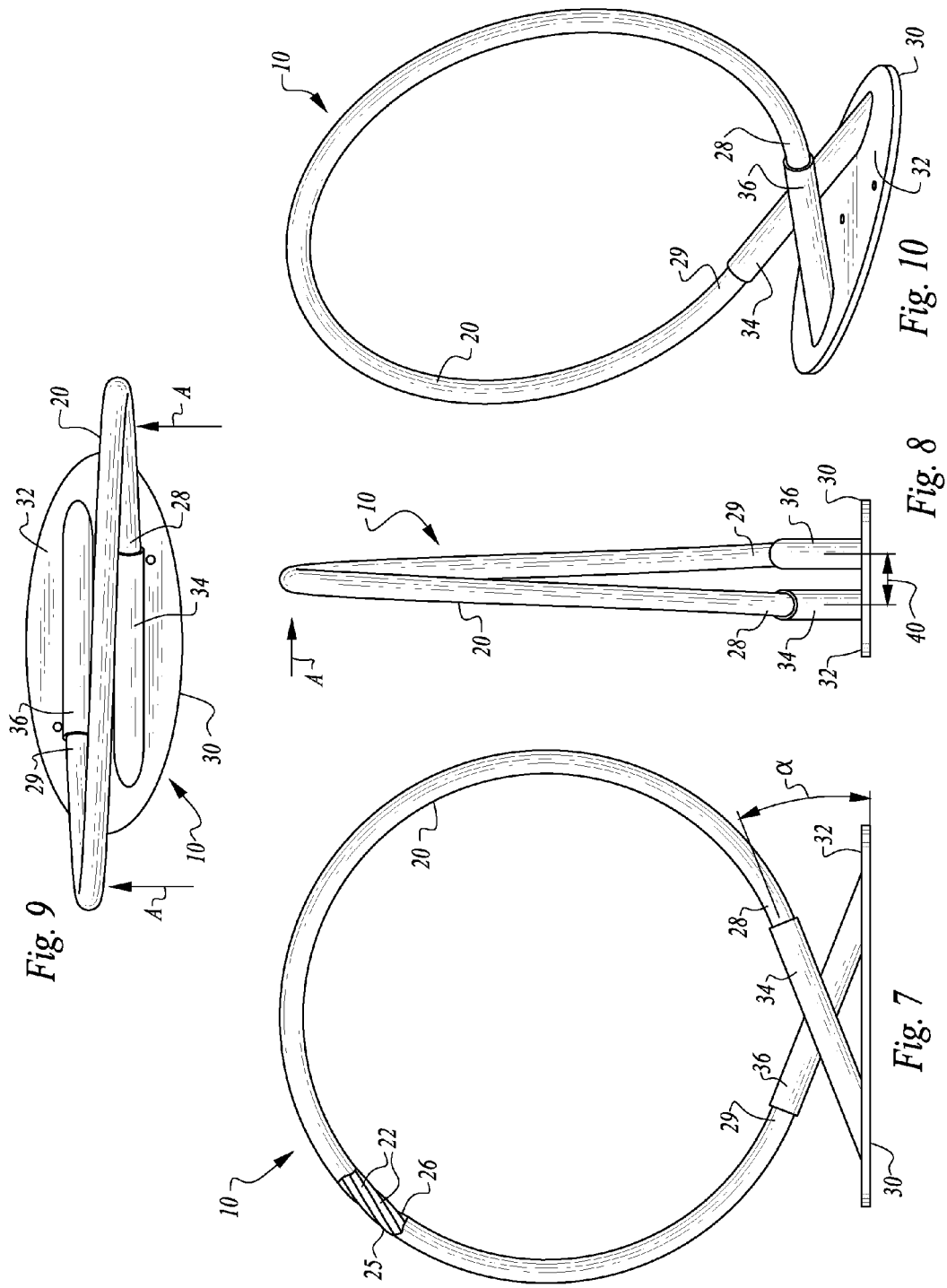

BICYCLE PARKING RACK FEATURING FLEXIBLE ROPE WIRE

CROSS-REFERENCE TO RELATED APPLICATIONS

This application claims benefit under Title 35, United States Code §119(e) of U.S. Provisional Application No. 61/857,774 filed on Jul. 24, 2013.

FIELD OF THE INVENTION

The following invention relates to parking racks and parking stands for providing a location where bicycles can be locked or otherwise parked in an upright manner, such as outside buildings which are accessed by bicycle traffic. More particularly, this invention relates to bicycle parking stands which are formed of rope wire to exhibit flexibility but which are configured to maintain sufficient stability to still function as a bicycle parking stand.

BACKGROUND OF THE INVENTION

Bicycle parking racks come in a variety of different configurations and styles to provide locations where bicycles can be parked, such as outside buildings, and to provide a location where bicycles can be secured, such as with some form of locking device. Such bicycle parking racks or stands are typically formed of a rigid material, typically steel. This allows the bicycle to be kept safe from theft and provides the parking stand with sufficient ruggedness to avoid damage from bicycles, foot traffic and other general wear and tear and from weathering effects.

Rigid bicycle parking racks do have some drawbacks. The rigid rack can damage the bicycle when the bicycle is brought into close proximity with the rigid elements of the bicycle parking rack to lock the frame of the bicycle to the rack. Also, pedestrians will occasionally accidentally walk into a bicycle parking rack and the rigidity of the bicycle parking rack will contribute to injuries to the pedestrian.

Another problem with bicycle parking stand rigidity is that often with a wide variety of bicycle styles and lock styles, it is difficult to couple the bicycles to the parking stand through the lock. The rigidity of the parking stand and the rigidity of the bicycle frame requires that the bicycle and the parking stand be aligned precisely together or that the lock have appropriate adaptability to accommodate the distance and orientation between the bicycle and parking stand. While such a locking procedure can typically be accommodated when only one bicycle is on a parking stand, this is not nearly as easy when multiple bicycles are already locked up to the bicycle parking rack.

If the bicycle parking rack had some degree of flexibility itself, the variety of bicycle frame sizes and shapes would be more easily accommodated in an optimal fashion for locking. Furthermore, the rigidity of bicycle parking stands makes them incompatible with rights of way which are required to be maintained for emergency vehicle traffic, such as fire lanes. If a bicycle parking rack were sufficiently flexible to allow it to flex when driven over by emergency vehicle traffic, an opportunity is presented for utilizing bicycle parking stand locations for vehicle traffic in an emergency situation.

SUMMARY OF THE INVENTION

With this invention a bicycle parking rack is provided which is formed of flexible rope wire. The rope wire is curved into an orientation which is generally circular extending between a first end and a second end. The rope wire itself is most typically formed of bundles of individual strands of wire all encapsulated within a coating. This coating is preferably at least partially transparent so that the rope wire nature of the underlying structure can be seen by the user. The coating is preferably somewhat elastomeric to act as a form of bumper when coming into contact with a frame of a bicycle or other structures or pedestrians.

The first end and second end are joined to an anchor through a first interface and a second interface on the anchor. These interfaces can be in the form of sleeves with hollow bores sized to receive the ends of the rope wire therein and coupled thereto with an appropriate fastener. As an alternative, the interfaces could merely be in the form of embedding the ends in cementitious material or utilizing other forms of fasteners to join the rope wire ends to the anchor.

Importantly, the interfaces of the anchor are offset laterally so that the length of rope wire between the ends actually follows a slightly helical circuit between the first and the second end. The pitch of this helical path followed by the length of rope wire can be increased by increasing the offset distance or decreased by reducing the offset distance.

This offset adds stability to the length of rope wire so that it is better able to withstand lateral loads. For instance, when the weight of a bicycle is pressing against the bicycle parking stand, such as under wind loads, it is important that the parking rack maintain a substantially upright posture. The offset between the first interface and second interface of the anchor provides such enhanced stability. The rope wire is also imparted with stability characteristics by having the thickness of the rope wire be a sufficiently large fraction of the diameter of the generally circular form of the length of rope wire, and by the material from which the rope wire is formed (typically steel). The parking rack thus exhibits the optimal balance of stability and flexibility.

In various embodiments a gap between the first interface and second interface perpendicular to the offset can be varied to accommodate anchors of different styles or to impart a slightly different appearance to the parking rack. The ends of the rope wire attach to the interfaces with the ends extending along tangent lines which can either be tangent with a horizontal ground plane or which exhibit an angle relative to the horizontal ground plane so that the length of rope wire follows a majority of a circular form, but stops short of forming a full circle, when viewed from the side. The orientation of these tangent lines extending from the ends of the rope wire can be adjusted to further adjust stability and flexibility characteristics of the parking rack and to adjust the appearance and style of the parking rack.

OBJECTS OF THE INVENTION

Accordingly, a primary object of the present invention is to provide a parking rack which exhibits both flexibility characteristics and stability characteristics for convenient parking of bicycles adjacent thereto.

Another object of the present invention is to provide a bicycle parking rack which avoids damage to a bicycle adjacent thereto by flexing.

Another object of the present invention is to provide a bicycle parking rack which is formed of rope wire.

Another object of the present invention is to provide a bicycle parking rack which has an aesthetic form which includes curving and circular elements.

Another object of the present invention is to provide a bicycle parking rack which exhibits sufficient flexibility that it is less of a hazard to pedestrians accidentally walking into the parking stand and which can accommodate vehicular traffic impacts there against to some extent.

Another object of the present invention is to provide a bicycle parking rack which is formed of rope wire coated with an at least partially transparent coating so that the rope wire construction of the bicycle parking rack can be seen through the coating.

Another object of the present invention is to provide a bicycle parking rack which includes an anchor which can be fastened to ground in a variety of different ways and which can be utilized along with other similar bicycle parking racks or in conjunction with bicycle parking racks of other configurations to maximize the usefulness of a bicycle parking area.

Other further objects of the present invention will become apparent from a careful reading of the included drawing figures, the claims and detailed description of the invention.

BRIEF DESCRIPTION OF THE DRAWINGS

FIG. 1 is a perspective view of a strand of rope wire with a coating on an outer surface thereof and revealing bundles of strands forming the rope wire beneath the coating.

FIG. 2 is an end full sectional view of the rope wire of FIG. 1 further revealing how the strands are gathered together in bundles which form the rope wire and with a coating on an outer surface thereof.

FIG. 3 is a perspective view of a parking rack according to one embodiment of this invention with a bicycle parked adjacent thereto.

FIG. 4 is a perspective view of the bicycle parking rack with a slightly modified configuration and anchor structure according to a second embodiment, and with a portion of a coating on the rope wire removed to show interior details.

FIG. 5 is a side elevation view of the parking rack of this invention illustrating further the configuration of the parking rack and rope wire and anchor components thereof relative to a ground surface, and with a portion of a coating on the rope wire removed to show interior details.

FIG. 6 is a top plan view of that which is shown in FIG. 5 and further illustrating particular construction details of the parking rack of this invention.

FIG. 7 is a side elevation view of a slightly modified embodiment of this invention including dimensions of one embodiment, and with a portion of a coating on the rope wire removed to show interior details.

FIG. 8 is an end elevation view of that which is shown in FIG. 7.

FIG. 9 is a top plan view of that which is shown in FIG. 7.

FIG. 10 is a perspective view of that which is shown in FIG. 7.

DESCRIPTION OF THE PREFERRED EMBODIMENT

Referring to the drawings, wherein like reference numerals represent like parts (or closely related parts from similar embodiments) throughout the various drawing figures, reference numeral 10 is directed to a parking rack (FIGS. 3 and 4) which is primarily formed of rope wire 20 for use in parking bicycles B adjacent thereto and for locking of bicycles B. The parking rack 10 is configured so that it exhibits optimized flexibility and stability for beneficial parking rack 10 performance.

In essence, and with particular reference to FIGS. 3 and 4, basic details of the parking rack 10 are described, according to various embodiments disclosed herein. The parking rack 10 is formed from a length of rope wire 20 curved into a generally circular shape. The rope wire 20 has ends thereof coupled to an anchor 30. The anchor 30 holds the ends of the rope wire 20 securely to the anchor and facilitates fixation to the ground or to some other underlying structure. The length of rope wire 20 is held by the anchor 30 so that the ends of the rope wire 20 exhibit an offset 40 laterally from each other. Thus, the rope wire 20 follows a somewhat helical path between the ends.

This offset 40 adds stability to the rope wire 20, along with the relative thickness of the rope wire 20 compared to the diameter of the generally circular form of the rope wire 20, to give it sufficient stability to maintain an upright form when experiencing lateral loads (along arrow A of FIGS. 6, 8 and 9) such as those associated with having a bicycle B parked adjacent thereto. The ends of the rope wire 20 also can in some embodiments exhibit a gap 50 in a direction perpendicular to the offset 40, where the ends of the rope wire 20 are adjacent to the gap 50. The rope wire 20 is also encapsulated within a coating 25 so that a somewhat resilient surface is presented on the rope wire 20 to avoid damage being caused to a bicycle B parked adjacent to the parking rack 10 and locked to the parking rack 10.

More specifically, and with particular reference to FIGS. 1 and 2, details of the rope wire 20 forming the parking rack 10 are described, according to a preferred embodiment. The rope wire 20 (also referred to as cable) can be formed in any manner that rope wire or cable is known to be formed. In this preferred embodiment, the rope wire 20 is formed of multiple bundles 22 of multiple strands 24. The individual strands 24 of wire are grouped together in the bundles 22 and then multiple bundles 22 are formed together to provide the rope wire 20. In one embodiment seven bundles 22 are provided in the rope wire 20 (FIG. 2) and a number of strands 24 generally greater than seven, but optionally seven or less than seven, are provided within each bundle 22. Grooves 26 define depressions in the outer surface of the rope wire 20 between adjacent bundles 22.

A coating 25 coats the portions of the bundles 22 which are on an outside of the rope wire 20, with the coating 25 extending into the grooves 26 between the bundles 22. Typically, this coating 25 has a thickness approximately similar to a diameter of an individual strand 24 of wire, but could have a greater thickness or a lesser thickness. The coating 25 preferably encapsulates the rope wire 20 completely. The coating is preferably somewhat resilient in character so that it can absorb loads applied thereto by flexing somewhat and resiliently returning after the load has diminished.

Various elastomeric materials can suitably provide this encapsulating coating 25. The coating 25 can be sprayed on, painted on, or otherwise applied in any manner that such coatings 25 are known to be applied. In one embodiment the coating 25 is at least partially transparent so that the individual strands 24 and the bundles 22 can be seen through the coating 25. In an alternative embodiment, the coating 25 is opaque. If the coating 25 is sufficiently thin, the strands 24 can still be seen to some extent. However, most typically the coating 25, if opaque, leaves only the bundles 22 visible along with the grooves 25 between the bundles 22.

The bundles 22 and strands 24 are typically wrapped together in forming the rope wire 20. Thus, the bundles 22 appear to curve as the rope wire 20 extends along its length. Within each bundle 22, the strands 24 also follow a curving helical pattern within each bundle 22 as the strands 24 extend along the rope wire 20. Most typically, the strands 24 are wrapped in a first direction and the bundles 22 are wrapped in a second direction opposite the first direction. In a second embodiment the strands 24 and bundles 22 are both wrapped in the same direction, with these two embodiments causing the strands 24 to either follow generally closer to parallel with the length of the rope wire 20 or closer to perpendicular to the length of the rope wire 20.

The rope wire 20 extends between a first end 28 and a second end 29. These ends 28, 29 are fixed to the anchor 30. The length of rope wire 20 between the ends 28, 29 follows the generally circular curve which is slightly helical due to the offset 40 between the ends 28, 29. Each end 28, 29 has a tangent line adjacent the first end 28 and the second end 29. These include a first tangent line 41 tangent to the first end 28 and a second tangent line 42 tangent with the second end 29 (FIGS. 5 and 6). These tangent lines 41, 42 are non-vertical and exhibit an angle relative to horizontal ground G (FIG. 5) which is dictated by portions of the anchor 30 holding the first end 28 and second end 29. Thus, the length of rope wire 20 at a minimum extends over more than half of a full circle and at a maximum can conceivably extend approximately a full circle between the first end 28 and second end 29.

The rope wire 20 can have various different dimensions, but most typically follows a curving form which causes a diameter of the generally circular form of the rope wire 20 to be about twenty-six inches in one embodiment (see FIG. 9) and to be approximately thirty inches high (see FIG. 7). The cross-sectional thickness of the rope wire 20 in this embodiment is typically slightly greater than one inch, such as one and a quarter inches to one and a half inches. The offset 40 in this typical embodiment is approximately three inches (see FIG. 8). With such an offset and with such a thickness of the rope wire 20, and with this diameter for the circular form of the rope wire 20, a somewhat flexible parking rack 10 is provided which still exhibits stability characteristics which keep the parking rack 10 from flopping laterally under lateral loads A, such as those caused by bicycles B being attached thereto or wind loads.

With particular reference to FIGS. 3 and 4, basic details of the anchor 30 are described according to various embodiments. The anchor 30 generally includes an upper surface 32 and a first interface 34 and second interface 36. The anchor 30 affixes to the first end 28 and second end 29 to hold them securely, and also is fixed to ground G or some other underlying structure. In one simple embodiment the anchor 30 is in the form of a planar plate with the upper surface 32 having the first interface 34 and second interface 36 extending upward therefrom at angles from the upper surface 32. The first interface 34 couples to the first end 28 of the rope wire 20 and the second interface 36 couples to the second end 29 of the rope wire 20.

In the embodiment of FIG. 3, the first interface 34 and second interface 36 are in the form of rigid tubular structures having a hollow bore sized to receive the ends 28, 29 therein. These ends 28, 29 can either be adhesively bonded, welded, crimped, coupled with fasteners or in some other manner coupled within the interfaces 34, 36. In the embodiment of FIG. 4, the first interface 34 and second interface 36 are in the form of the anchor 30 having holes extending thereinto in which the first end 28 and second end 29 can be located and attached.

Other forms of interfaces 34, 36 could also be provided, including merely embedding the ends 28, 29 within cementitious material which can either be prefabricated along with positioning of the rope wire 20 and then later affixed within a parking area, or the rope wire 20 could be conceivably affixed to the anchor 30 at the same time that the parking area has cementitious material poured during construction of such a parking area. Other forms of anchors 30 could also be utilized which could conceivably not include any particular upper surface 32 and could be entirely subsurface and have cementitious material poured around, or have other geometries. In the embodiment shown in FIG. 3, fasteners can pass through the plate from the upper surface 32 down through to a lower surface and the into an underlying structure or surface for anchoring of the anchor 30 to the ground G (FIG. 5).

Importantly, the first interface 34 and second interface 36 are spaced apart by the offset 40 (FIG. 6) which is measured as a distance between the first tangent line 41 and the second tangent line 42. These tangent lines 41, 42 are aligned with centerlines of the first interface 34 and second interface 36. Most preferably, these tangent lines 41, 42 are each oriented within planes which are parallel with each other so that these tangent lines do not intersect. As an alternative, the tangent lines 41, 42 could have an orientation which is in planes which are not entirely parallel with each other, but typically somewhat close to parallel. Most preferably, the tangent lines 41, 42 are not aligned with a horizontal plane such as that defined by ground G (FIG. 5) but rather extend downwardly past the ends 28, 29 of the rope wire 20. Angles of these tangent lines 41, 42 relative to horizontal ground G are measured as a first interface angle $\alpha$ for the first tangent line 41 and second interface angle $\beta$ for the second tangent line 42. In one embodiment, each of these interface angles $\alpha$, $\beta$ are 25°. In other embodiments the angles could be different from each other and could be as low as 0° or as high as somewhat less than 90°.

In use and operation, after the parking rack 10 has been secured to ground G or an underlying structure through the anchor 30, a bicycle B can be brought up adjacent the parking rack 10 and rest against the parking rack 10 (FIG. 3). If desired, a locking device can be utilized to secure the frame or other portions of the bicycle B to the parking rack 10.

The relatively large thickness of the rope wire 20 (typically at least one inch, and most optimally one and one quarter to one and a half inches, or greater) causes the rope wire 20 to have some degree of stability when curved into the generally circular form and actually following somewhat of a helical path between the first end 28 and second end 29. Furthermore, by offsetting the first end 28 and second end 29 with the offset 40, stability is added to the parking rack 10 so that when lateral loads A (FIGS. 6, 8 and 9) are encountered by the parking rack 10, the parking rack 10 resists such lateral loads A somewhat. For instance, when a bicycle has its weight leaning against the parking rack 10, the parking rack 10 may move slightly, but will still maintain a primarily upright orientation. When wind loads are applied to the parking rack 10, the parking rack 10 withstands those wind loads and maintains an upright orientation.

However, if a pedestrian were to walk fast into the parking rack 10 or fall into the parking rack 10, the parking rack 10 would give way to a greater extent, somewhat cushioning the fall of the pedestrian. Furthermore, should vehicular traffic accidentally (or in an emergency situation) drive into the parking rack 10, the parking rack 10 would exhibit flexibility to avoid severe damage to the vehicle and also to the parking rack 10. Conceivably, if such a vehicle strike were to occur, damage to an outer coating 25 could perhaps be repaired, or a rope wire 20 portion of the parking rack 10 could be removed and replaced, while no damage to the anchor 30 would be experienced.

In at least some embodiments, and in appropriate circumstances, emergency traffic lanes, such as fire lanes could potentially at least partially be designed to serve the dual purpose of parking area for bicycles and still be available in an emergency situation, such as by warning bicycle riders that bicycles are subject to damage by emergency vehicles in emergency situations. Perhaps most typically, the parking rack 10 would still be located in areas outside of fire lanes and the flexibility of the parking rack 10 would only accommodate impact from vehicles in accidental circumstances.

While the rope wire 20 could be provided from a variety of different sources, most preferably the rope wire 20 is reclaimed from cable or other rope wire 20 which has already undergone a first useful life in an application where the rope wire 20 strength and structural integrity is critical, such as in powering cable cars, ski resort chair lifts, gondolas, suspension bridges, guy wires, or other applications where structural strength of the rope wire 20 or cable must be maintained. When such rope wire 20 or cable is being replaced, it can beneficially be reutilized to form the portions of the parking rack 10 where the highest degree of structural strength is no longer required, so that the rope wire 20 or other cable can be beneficially reclaimed and reused for optimal sustainability.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A bicycle parking stand, comprising in combination:
   a continuous length of rope wire extending between a first end and a second end;
   said length of rope wire continuously curved more than 180° at a portion thereof between said first end and said second end;
   said first end and said second end of said length of rope wire located at lowest portions of said curved rope wire;
   said length of rope wire following a helical path around a horizontal central axis on at least portions thereof between said first end and said second end;
   an anchor including a first interface and a second interface, said first interface holding said first end of said rope wire, said second interface holding said second end of said rope wire; and
   said first interface and said second interface spaced apart laterally and parallel to said horizontal central axis by an offset distance parallel with said central axis.

2. The bicycle parking stand of claim 1 wherein said rope wire is coated on an exterior thereof.

3. The bicycle parking stand of claim 2 wherein said rope wire includes a plurality of bundles gathered together with each said bundle including a plurality of strands therein, said coating being at least partially transparent such that said bundles and said strands can be viewed through said coating.

4. The bicycle parking stand of claim 1 wherein said anchor is fixed to ground.

5. The bicycle parking stand of claim 4 wherein at least one of said first interface and said second interface is a substantially rigid sleeve with a hollow interior having a diameter sufficiently large to receive one of said ends of said length of rope wire therein.

6. The bicycle parking stand of claim 1 wherein said offset has a measurement greater than a thickness of said rope wire.

7. The bicycle parking stand of claim 1 wherein said offset is substantially constant in size between a pair of parallel planes, each plane containing a line tangent with one of said first end and said second end of said length of rope wire.

8. The bicycle parking stand of claim 1 wherein a gap is provided between said first end and said second end substantially perpendicular to said offset.

9. The bicycle parking stand of claim 1 wherein at least one of said first end and said second end of said length of rope wire is held to said anchor at angles to horizontal which are greater than zero.

10. The bicycle parking stand of claim 1 wherein at least one of said first end and said second end of said length of rope wire is held to said anchor in an orientation tangent with a horizontal ground surface to which the anchor is fixed.

* * * * *